Nov. 22, 1938.   A. H. KRIMMEL   2,137,618
FISHING LEADER REEL
Filed March 7, 1938
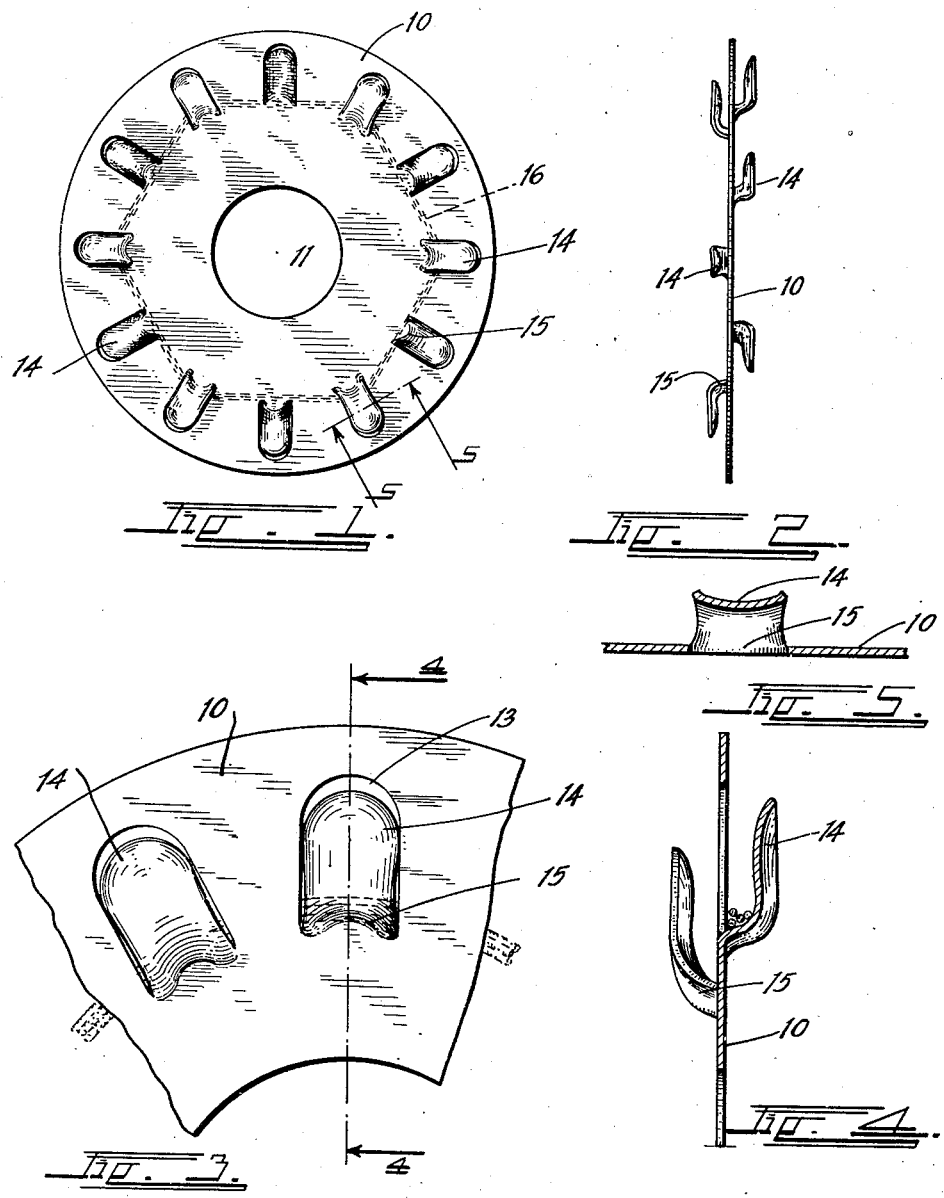
INVENTOR.
ALBERT H. KRIMMEL
BY
ATTORNEY.

Patented Nov. 22, 1938

2,137,618

UNITED STATES PATENT OFFICE 2,137,618

FISHING LEADER REEL

Albert H. Krimmel, Denver, Colo.

Application March 7, 1938, Serial No. 194,409

2 Claims. (Cl. 242—118)

This invention relates to a reel for carrying fishing leaders. The usual fisherman coils his leader around his hand, ties the ends and throws it in his leader box. As a result the leader becomes tangled and kinked thus making it difficult to straighten and soon resulting in breaking the leader.

The principal object of this invention is to provide a simple and compact device upon which one or more leaders can be quickly and easily wound; which can be placed in the usual leader box; and which will prevent tangling or breaking of the leaders.

Leader reels have been made for receiving the coiled leader. These devices have not proven satisfactory for the reason that they often present sharp cutting edges to the leaders which cut into the surface of the leader to leave weak points which will soon destroy the leader.

Another object of this invention is to provide a device of this character which can be cheaply and easily formed from a single sheet of metal or other sheet material and yet which will not present any sharp edges to contact with the leaders.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a face view of the improved leader reel.

Fig. 2 is an edge view thereof.

Fig. 3 is an enlarged detail view of a portion of the leader reel.

Fig. 4 is a detail section taken on the line 4—4, Fig. 3.

Fig. 5 is a similar section, taken on the line 5—5, Fig. 1.

The improved leader reel consists of a disc of sheet material, preferably but not necessarily sheet aluminum, of a diameter to fit into the usual round leader box carried by fishermen. The center of the disc 10 is provided with an opening 11 to provide a finger grip by means of which the reel can be easily lifted from the leader box and to provide a space in which spinners and other fish lures may be placed.

An arcuate series of U-shaped cuts 13 is stamped through the disc 10 forming round ended tabs 14. These tabs are alternately bent outwardly on opposite faces of the disc and then turned parallel to faces of the discs as illustrated to form two series of tabs, one on each face of the disc.

It is desired to call attention to the fact that the tabs are not flat but are bent to a channel-like cross section with their convex faces toward the disc and at the point where they are attached to the disc, they are rounded outwardly, as indicated at 15, to present a convex face to the wound leader.

In use the leader can be wound on either or both sides of the disc over the tabs, as indicated by the broken line 16, in Fig. 1.

It will be noted that, due to the round or convex inner face on the tab, the leader does not touch the edge of the tab at any point. It contacts therewith only on its rounded surface so that there is no cutting action whatever on the leader and so that any burrs or sharp edges formed by the stamping operation do not reach or damage the leader.

While sheet aluminum has bee described as the preferred material, the invention is not limited to this particular material as the reel could be formed of any suitable metallic or non-metallic material.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A leader reel comprising: a disc having a series of U-shaped cuts in its face; tabs turned outwardly from said cuts to form means for receiving a wound leader; said tabs being bent to present a convex face to said leader throughout their length so that the edges thereof will not contact said leader.

2. A leader reel comprising: a disc having a series of U-shaped cuts in its face; tabs turned outwardly from said cuts to form means for receiving a wound leader; said tabs being bent to present a convex face to said leader throughout their length so that the edges thereof will not contact said leader; the alternate tabs in said series projecting from alternate faces of said disc.

ALBERT H. KRIMMEL.